United States Patent [19]
Lee et al.

[11] Patent Number: 5,411,689
[45] Date of Patent: May 2, 1995

[54] METHOD FOR ACCELERATING REMOVAL OF RESIDUAL BLOWING AGENT FROM EXTRUDED FLEXIBLE FOAMS

[75] Inventors: Shau-Tarng Lee, Oakland; Andrew Oiestad, New Providence, both of N.J.

[73] Assignee: Sealed Air Corporation, Saddle Brook, N.J.

[21] Appl. No.: 37,036

[22] Filed: Mar. 25, 1993

[51] Int. Cl.6 ............................................. B29C 67/22
[52] U.S. Cl. .................................... 264/53; 264/234; 264/321; 264/DIG. 15
[58] Field of Search .................. 264/321, 51, 53, 234, 264/DIG. 15

[56] References Cited

U.S. PATENT DOCUMENTS

| | | | |
|---|---|---|---|
| 3,091,017 | 5/1963 | Wetterau | 156/148 |
| 3,091,019 | 5/1963 | Wetterau | 156/78 |
| 3,119,147 | 1/1964 | Kracht | 425/335 |
| 3,200,437 | 8/1965 | Sasanko | 264/DIG. 15 |
| 3,319,294 | 5/1967 | Borsvold et al. | |
| 3,860,371 | 1/1975 | Willy | 264/46.2 |
| 3,959,545 | 5/1976 | Siedenstrang | 428/141 |
| 4,173,077 | 11/1979 | Birke et al. | 34/23 |
| 4,316,717 | 2/1982 | Thome | 432/8 |
| 4,420,448 | 12/1983 | Krutchen | 264/53 |
| 4,485,059 | 11/1984 | Krutchen et al. | 264/DIG. 15 |
| 4,694,027 | 9/1987 | Park | 264/53 |
| 4,696,642 | 9/1987 | Hatta | 432/59 |
| 4,721,588 | 1/1988 | Burchard et al. | 264/DIG. 15 |
| 5,059,376 | 10/1991 | Pontiff et al. | 264/234 |
| 5,124,097 | 6/1992 | Malone | 264/51 |

FOREIGN PATENT DOCUMENTS

| | | | |
|---|---|---|---|
| 3013318 | 1/1991 | Japan | 264/DIG. 15 |

Primary Examiner—Allan R. Kuhns
Attorney, Agent, or Firm—Bell, Seltzer, Park & Gibson

[57] ABSTRACT

A method is disclosed for accelerating the removal of blowing agent from elongate, flexible polyolefin foam bodies, such as polyethylene foam sheeting, in the absence of substantial tension on the foam body so as to avoid breaks in the foam body. The elongate flexible foam body is introduced into a heating zone and draped over a plurality of substantially parallel bars in an endless path. Tension on the foam body is avoided because the foam loops are free hanging between these parallel bars. An endless drive means transports the parallel bars through the heating zone about the endless path, thereby transporting the foam body through the heating zone for removal of blowing agent. Forced heated air is blown over the exposed surface of the foam body at a pre-determined temperature and for a pre-determined time sufficient to remove a substantial portion of the residual blowing agent and to cause sufficient air to diffuse into the foam body so that there is no substantial reduction in the thickness of the foam.

11 Claims, 1 Drawing Sheet

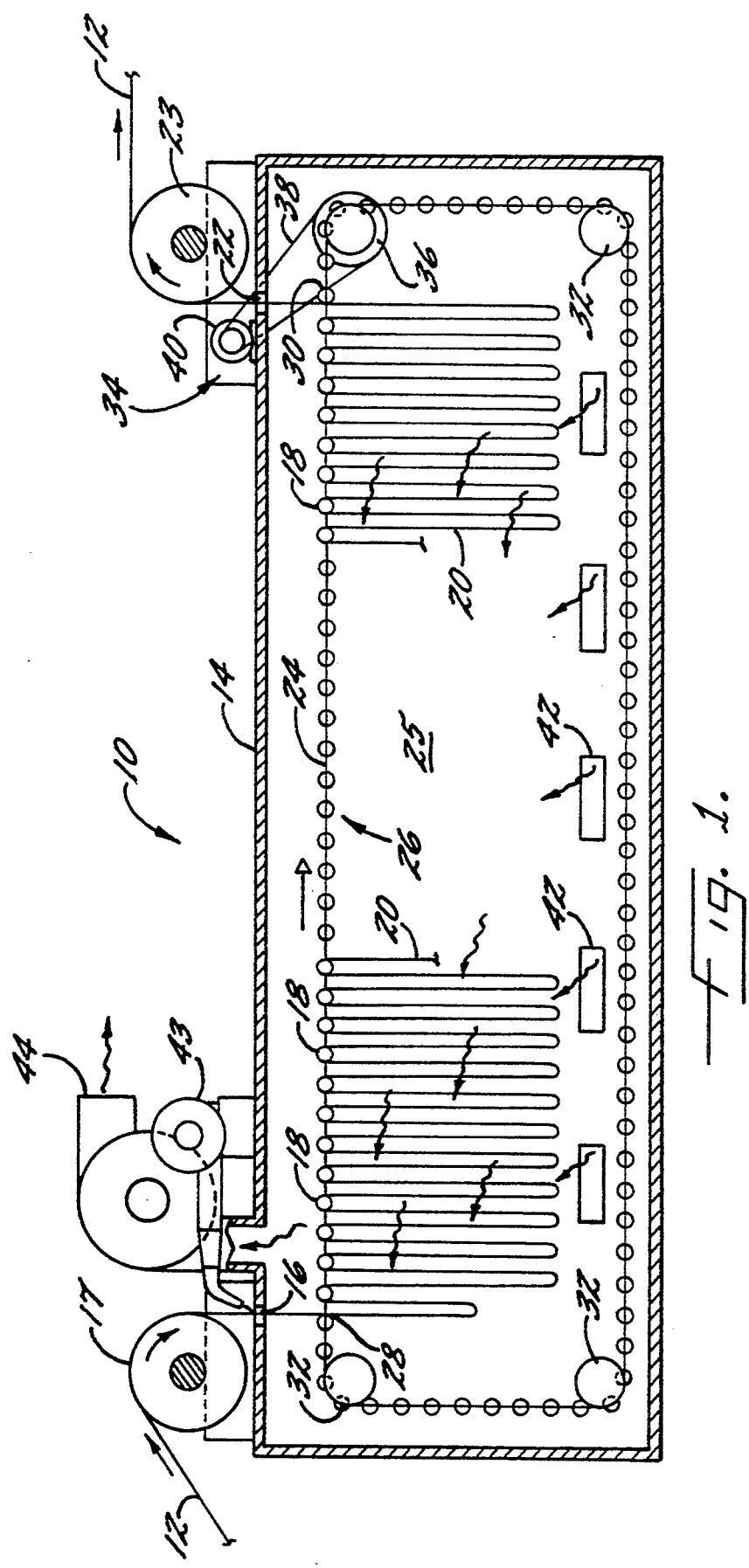

METHOD FOR ACCELERATING REMOVAL OF RESIDUAL BLOWING AGENT FROM EXTRUDED FLEXIBLE FOAMS

FIELD OF THE INVENTION

This invention relates to aging of expanded thermoplastic polymers by removing the residual blowing agent therefrom. In particular, this invention relates to accelerated aging of foam products produced by extrusion foaming.

BACKGROUND OF THE INVENTION

In the extrusion foaming process a blowing agent is mixed with a molten thermoplastic resin under pressure and the mixture is then cooled and extruded through a forming die into a zone of reduced pressure. The blowing agent expands in the zone of reduced pressure, thereby expanding the thermoplastic resin to produce a cellular thermoplastic structure having far less density than the resin from which the foam is made. The foam structure is maintained by replacing with air the blowing agent in the cells of the foam.

The term "aging" describes the replacement of blowing agent in the cells of a foam with air. The blowing agent diffuses out of the cells of the foam over time and air diffuses into the cells to support the cellular structure. The diffusivity of the blowing agent relative to air coming into the cells impacts the stability of the foam over time and whether the cells of the foam may collapse. Additives may be incorporated into the resin and processing conditions for extruding the resin may be adjusted to assist in controlling the diffusivity of the blowing agent, to promote foam stability, and to limit collapse of the foam within acceptable limits.

Many of the halogenated hydrocarbons have been used for several years as blowing agents for extrusion foaming of thermoplastic resins. The halogenated hydrocarbons include the chlorofluorocarbons ("CFCs"), hydrofluorocarbons ("HFCs"), and hydrochlorofluorocarbons ("HCFCs"). CFCs, HFCs, and HCFCs have a number of advantages as blowing agents. CFCs, HFCs, and HCFCs are generally soluble in the resin and some have low permeability and volatility. Halogenated hydrocarbons generally produce foams of high quality with a minimum of processing difficulty.

CFCs, HFCs, HCFCs, and other halogenated hydrocarbons typically are either not flammable or are of low flammability, which greatly reduces the care with which they may be used. These compounds have the further advantage of low toxicity. However, governmental regulation is phasing out use of halogenated hydrocarbons because of environmental considerations.

Producers of thermoplastic foam products have been seeking alternatives to CFC, HFC, and HCFC blowing agents for a number of years to reduce or eliminate altogether the amount of halogenated hydrocarbons used. A number of volatile organic compounds ("VOCs") have been proposed. VOCs include the light aliphatic hydrocarbons such as propane, n-butane, isobutane, butylene, isobutene, pentane, neopentane, and hexane, to name but a few. High quality extruded foams have been produced using VOC blowing agents. However, the diffusivity of VOCs can be many times faster than that of the halogenated hydrocarbons and harder to control. Foam collapse and stability problems have been encountered. VOCs typically are flammable and some are toxic, thus presenting handling problems and safety concerns.

Foam products made with blowing agents that are not toxic or flammable can be shipped and stored soon after they are made. Accumulations of such blowing agent diffusing out of the foam after shipment and storage generally have not presented significant problems.

However, the increasing use of flammable and toxic VOC blowing agents, such as butane, presents handling problems and safety concerns. Unassisted aging of a foam can take weeks or months to complete. Flammable or toxic gas released from such foam shipments into an enclosed area, for example, the trailer of a tractor-trailer rig, could result in some instances in property damage and personal injury. The use of permeability modifiers to control the rate of diffusion of the VOC blowing agent out of the foam may increase the likelihood of problems occurring.

Various methods have been proposed for alleviating the problems associated with removing VOC blowing agents from thermoplastic foams. Large warehouses may be used for aging the foams. Excessive labor may be used manually to expose sufficient surface area of a foam product to shorten the aging period. Controlled exposure of the foam to mild heat accelerates the aging process and can be used to shorten the aging period.

As an example of accelerated aging, U.S. Pat. No. 5,059,376 discloses methods of applying heat to foamed polymer products for rapidly purging blowing agents. In one method, a sheet of foam is said to be festooned through a plurality of horizontally and vertically spaced driven rollers that transport the foam through an oven. However, the use of driven rollers has the disadvantage that tension is placed on the foam and can result in breakage of the product. Use of driven rollers is also disadvantageous in that the foam sheeting initially is threaded and sometimes rethreaded through the rollers, resulting in increased expense and difficulty of operation.

Another method disclosed in U.S. Pat. No. 5,059,376 is to pile folds of freshly extruded foam sheeting onto a slow moving conveyor belt in a ruffled fashion. The conveyor then moves the foam through a treatment chamber. U.S. Pat. No. 5,059,376 discloses that the curing time required for this method is probably somewhat longer than that for the method using rotating and driven rollers because there would be less air flow between the layers of the foam and the layers would not be physically separated, but would be touching each other in many places.

It would be desirable to maximize the exposed surface area of a foam product for accelerated aging without placing tension on the foam that could result in breakage of the foam product or introducing undesirable steps into the aging process that may increase expense or difficulty. In this manner, the disadvantages of flammable, toxic, or otherwise undesirable blowing agents could be overcome without significant loss of time or product due to broken webs of extruded foams, such as foam sheeting.

SUMMARY OF THE INVENTION

The invention claimed herein provides for accelerating the removal of a residual blowing agent from elongate, flexible foam bodies, for example, polyethylene foam sheeting, with minimum breakage. The foam body is transported through a heating zone with its exposed surface area maximized without placing substantial tension on the foam body and without requiring threading of the foam body through the heating zone.

More particularly, the elongate flexible foam body is suspended in loops between a plurality of supporting means so as to maximize the exposed surface area of the foam body. The suspended and supported foam body is then transported through a heating zone substantially in the absence of tension to minimize breakage, to remove the residual blowing agent, and to replace the blowing agent with air. The foam body is maintained in the heating zone at an elevated temperature for a time sufficient to remove a substantial portion of the residual blowing agent from the foam body and to cause sufficient air to diffuse into the foam body so as not to cause substantial collapse of the foam body.

In a more specific embodiment, the heating zone is a confined area such as an oven, and the elongate flexible foam body is introduced into the heating zone and draped over a plurality of substantially parallel bars in an endless path. An endless drive means transports the parallel bars through the heating zone about the endless path, thereby transporting the foam body through the heating zone for heating and removal from the heating zone. Tension is avoided on the foam body because the foam loops are free hanging between these parallel bars. Forced heated air is blown over the exposed surface of the foam body at a pre-determined temperature and for a pre-determined time sufficient to remove a substantial portion of the residual blowing agent and to cause sufficient air to diffuse into the foam body so that there is no substantial reduction in the thickness of the foam.

In still more specific embodiments, permeability modifiers may be incorporated into the thermoplastic polymer resin from which the foam body will be extrusion foamed. These additives allow the use of an increased temperature to accelerate aging without substantial reduction in the foam thickness.

BRIEF DESCRIPTION OF THE FIGURE

FIG. 1 is a schematic of a preferred embodiment of the practice of the invention claimed herein.

DETAILED DESCRIPTION OF THE INVENTION

FIG. 1 represents broadly at 10 a schematic of a device of the type that may be used to accelerate removal of residual blowing agent from elongate, flexible foam bodies of a foam extruded thermoplastic polymer without placing substantial tension on the foam body. Apparatus 10 is similar to the loop dryer ovens that have been used for drying textile products.

Flexible polyethylene foam sheeting 12 is shown entering an aging oven or heating zone 14 through an entrance at 16. The polyethylene foam sheeting is transported into the oven by means of a guide roll 17. Foam sheeting 12 has been produced from a low density polyethylene resin having a glycerol monostearate permeability modifier incorporated therein in an amount as described below. The resin has been expanded with a butane blowing agent in a conventional manner.

Flexible polyethylene foam sheeting is a product of great commercial significance, and it is instructive to illustrate the invention claimed herein in connection with such sheeting. However, the skilled artisan will recognize that the invention claimed herein may be practiced with respect to flexible foam products of a variety of thermoplastic polymers, and that the invention is not limited to practice with polyethylene foam sheeting or with flexible foam products produced from particular resins or blowing agents.

Upon entering the oven through the entrance thereto, the foam sheeting is picked up by a plurality of substantially parallel supporting bars 18. The parallel bars are members providing a means for supporting the foam body, suspending the foam body between the bars in the absence of substantial tension on the foam body, and transporting the foam body through the oven. The supporting bars travel in the direction shown by the arrow in FIG. 1.

Guide roll 17 turns at a rate faster than the transport of the bars. The sheeting is draped over the bars to form a plurality of free hanging foam loops 20. The length of the free hanging loops is determined by the ratio of the rate of rotation of the guide roll 17 to the rate of transport through the aging oven of the parallel supporting bars 18.

The bars 18 are shown spaced by a distance sufficient to enable the foam sheeting to form free hanging loops therebetween and to be supported by the bars. The spacing allows heated air to travel freely over the exposed surfaces of the foam sheeting, in a manner to be described below, but is compact to reduce the size of the oven.

As the bars travel in the direction of the arrow shown in FIG. 1, the bars transport the free hanging loops through the heating oven for removal of residual blowing agent. The now aged polyethylene foam sheeting leaves the oven through the opening 22 and is taken up by guide roll 23 for winding up on a roll and storage or shipment, as desired.

The bars are attached at each end to an endless moving drive chain, one side of which is shown at 24, that travels about an endless moving path forming a closed loop 25. The closed loop has a generally horizontally extending run 26 for supporting the free hanging loops of the foam body and for transporting the foam body from the initial contact point 28 of the foam sheeting with the bars through the heating zone to the release point 30. The drive chain then returns the bars about the endless path to the initial contact point for pickup of additional sheeting. The direction of longitudinal movement of the supporting bars is referred to below as the machine direction and is indicated in FIG. 1 by an arrow.

Guide gears 32 for supporting the drive chain 24 are located inside in the loop 25. A drive system is shown broadly at 34 for transporting the chain and bars about the endless path and from the initial contact point with polyethylene sheeting to the release point. Drive system 34 comprises a drive gear 36 inside the loop 25 that is driven by an endless belt 38 that is in turn driven by a motor 40.

Timing of the drive gear is controlled with respect to the feed rate of the foam at the entrance 16 to the oven, the residence time of the foam sheeting in the oven, and the spacing of the loops substantially to preclude under aging the foam. Under aging may not achieve the desired reduction in residual blowing agent concentration in the foam body.

In the embodiment shown in FIG. 1, air is supplied to the interior of the oven through a plurality of fresh air inlets 42. The air can be heated in a conventional manner as should be apparent to the skilled artisan. It is useful to circulate the air and to contact the surface of the foam body with a heated and forced fresh air stream. A fan 43 can be used in a conventional manner to circulate the air about the foam body for removal of blowing agent from the foam body and replacement thereby with air. The air and blowing agent may be exhausted from the oven through an outlet as is shown at 44 or remain in circulation. A conventional exhaust fan located in outlet 44 can be used to exhaust air and blowing agent from the oven. Blowing agent in the exhaust air may be incinerated, if desired, in a conventional manner. Fresh makeup air may be added to the oven through inlets 42.

The concentration of a blowing agent can be reduced substantially to alleviate handling problems and safety or other concerns in from a few minutes to a few hours. Generally, thicker foams take a somewhat longer period of time to age, all other things being equal. Optimal aging temperature and time also depends upon the nature of the blowing agent, the thermoplastic polymer resin from which the foam is made, and the nature and amount of any additives to the resin from which the foam will be made.

The invention typically will be used for accelerated aging of foams wherein the blowing agent is a flammable or toxic VOC. VOCs include the light aliphatic hydrocarbons such as ethane, propane, n-butane, isobutane, butylene, isobutene, pentane, neopentane, and hexane. Particularly desirable blowing agents for extrusion foaming of thermoplastic polymer products are propane, n-butane, isobutane, ethane, and mixtures thereof. Of these, normal-butane is perhaps the most highly permeable through polyethylene foam and is also the easiest to quickly purge from the foam.

The invention has been determined to be useful in accelerating the aging process of polyethylene foam sheeting. However, it should be apparent to the skilled artisan that the invention may be applied to a wide variety of elongate, flexible foam products of which polyethylene sheeting is exemplary. For example, the aging process for virtually any elongate, flexible, thermoplastic, foam product, such as a polyolefin foam product, should benefit from application of the invention claimed herein.

The resins from which polyolefin foams are produced may be defined as polymers derived from unsaturated hydrocarbons containing the ethylene or diene functional groups. Polyolefin resins may include virtually all of the addition polymers, however, the term polyolefin typically is used for polymers of ethylene, the alkyl derivative of ethylene (the alpha-olefins), and the dienes. Among the more commercially important polyolefins are polyethylene, polypropylene, polybutene, and their copolymers.

It is desirable to incorporate additives in the resin from which the foam is made to substantially preclude collapse of the foam by too rapid escape of permeable blowing agents. The additives may increase the temperature at which aging may be accelerated.

Permeability modifiers are particularly useful and have been determined to assist aging of the foam at elevated temperatures. There is a broad range of permeabilities for various blowing agents, and the permeability of a blowing agent will vary depending on the resin chosen. Therefore, the type and amount of permeability modifier for accelerated aging necessarily will be empirically determined, as should be well understood by the skilled artisan. However, the amount of the permeability additives generally will range from about 0.1 to 10 percent by weight of the resin composition.

An exemplary list of permeability modifiers includes esters of long-chain fatty acids and polyhydric alcohols, saturated higher fatty acid amides, saturated higher aliphatic amines and complete esters of saturated higher fatty acids, mixtures of glycerol mono- and di-glycerides, polystyrene, and others as are believed to be known by the skilled artisan. Glycerol monostearate has been determined to be particularly useful as a permeability modifier in the practice of the invention claimed herein.

As illustrated by the examples below, a glycerol monostearate based permeability modifier sold commercially as ATMER 129 by the Imperial Chemical Corporation, Wilmington, Del. (ICI) has been determined to be useful in controlling the aging process for polyethylene foams. In particular, ATMER 129 is useful in combination with a high permeability blowing agent such as butane. Accelerated aging for polyethylene foam produced from a resin containing a small amount of ATMER 129 and expanded with a butane blowing agent is preferably accomplished at a temperature of about 110° F.

Another glycerol monostearate permeability agent sold commercially as ATMOS 150 by the Humko Chemical Division of the Witco Chemical Corporation, Oakland, N.J. has been determined to be useful in the practice of the invention for accelerating the aging of polyethylene foams produced with lower permeability blowing agents such as isobutane. It is preferred to elevate the temperature of the oven to about 130° F. to further accelerate aging without significantly reducing the thickness of the foam.

The temperature of the heating zone should be controlled so as not to overheat or to under heat the foam body. Too much heat can result in collapse of the foam body. Too little heat may result in under aging of the foam unless the exposure time correspondingly is increased. Generally, for a polyethylene foam, a temperature as high as 180° F. will drive off in a minimum of time substantially all residual butane blowing agent from polyethylene foam sheeting. However, the tremendous loss in thickness of the foam makes operation at this temperature undesirable. On the other hand, operation at a temperature below about 70° F. is, generally, non-effective substantially to accelerate the aging of the foam.

EXAMPLES

The following examples provide specific illustrations of the practice of the invention claimed herein, but are not intended in any way to limit the scope of the invention.

Example 1

Relatively thick polyethylene foam samples ranging in thickness from about 0.185 inches to 0.250 inches were produced using a 100 percent normal butane blowing agent. At 110° F. the foam took from about one to two and one-half hours for removal of 75 to 80 percent of the residual blowing agent, depending on the thickness of the foam and the level and type of additive.

A foam of 0.250 inches thickness from a resin having 0.75 percent by weight of the resin of ATMER 129 incorporated therein lost over 80 percent of residual blowing agent in about two hours. This same resin, with about 0.75 percent ATMOS 150 incorporated therein instead of ATMER 129, lost 80 percent of residual blowing agent in 1 hour. About 80 percent of the butane blowing agent was removed in under two hours from a thinner foam at 0.185 inches and having 0.75 percent by weight of the resin of ATMER 129 incorporated therein.

Example 2

Relatively thin samples of flexible, extruded polyethylene foam sheeting were prepared at 0.03 and at 0.06 inches using isobutane as the blowing agent. For the 0.06 inch foam, removal of blowing agent to at least 80 percent was accomplished in about 8 minutes at 130° F. with addition of about 1.1 percent ATMOS 150 to the resin from which the foam was made. About 1.1 percent ATMER 129 produced a comparable reduction in about 11.5 minutes. Similar reductions were achieved for the 0.03 inch foam at slightly reduced time periods. In all cases, no substantial reduction in foam thickness was observed.

Example 3

Samples of 0.06 inch polyethylene foam sheeting from resin containing ATMOS 150 and expanded with isobutane blowing agent were heated to 60° F., 110° F., and 130° F. Aging was not significantly accelerated at 60° F. A reduction in isobutane of about 40 percent was obtained at 110° F. in about 10 minutes. A reduction in isobutane of about 80 percent was obtained at 130° F. in about 8 to 10 minutes, without substantial reduction in foam thickness. Example 3 demonstrates significant results in heating a foam blown with isobutane blowing agent to 130° F. and also demonstrates that aging is temperature sensitive in that relatively small changes in temperature can produce dramatic results.

Example 4

Samples of 0.06 inch polyethylene foam were prepared using four different blowing agents to demonstrate the relative speed with which various blowing agents may be removed from the foam at constant temperature. The temperature was maintained at 120° F. The polyethylene resin had a melt index of 1.0.

One hundred percent normal butane blowing agent produced a foam with 80 percent removal of residual blowing agent in five minutes and near 100 percent removal within 15 minutes. A reduction of about 80 percent in normal butane residual blowing agent represents a reduction down to about 2 percent by weight of the foam product and is sufficient significantly to reduce hazards of fire or toxicity. Removal was determined by weighing samples before aging and after since normal butane weighs about twice as much as air.

A mixture of normal butane, isobutane, and propane provided up to about 70 percent removal within about six minutes.

A mixture of isobutane and propane provided up to about 50 percent removal within about six minutes.

Relatively low permeability 100 percent isobutane was about 40 percent removed after about eight to ten minutes.

These examples illustrate that aging for thicker foams can be accelerated to about one to two hours or less and for thinner foams can be accelerated to occur in about six to ten minutes or less through the practice of the invention. However, the particular blowing agents, resins, permeability modifiers, and cell strengthening agents impact the temperature and time for which a foam successfully may be aged and generally should be empirically determined.

The invention has been described with reference to specific preferred embodiments of polymers, additives, temperatures and aging time, with specific examples. However, the foregoing discussion and examples should not be considered as limiting the scope of the invention. Rather, the scope of the invention should be determined in accordance with the appended claims.

What is claimed is:

1. A method for accelerating the removal of residual blowing agent from elongate, flexible foam bodies of an extruded thermoplastic polymer, said method comprising the steps of:
   (a) draping an elongate, flexible foam body over a plurality of substantially parallel supporting members extending in a direction substantially transverse to the lengthwise direction of the elongate foam body so as to form free hanging foam loops between the supporting members substantially to maximize the exposed surface area of the foam body;
   (b) transporting the parallel supporting members through a heating zone so as to transport the free hanging foam loops through the heating zone substantially in the absence of tension on the foam body to minimize breakage; and
   (c) removing a substantial portion of the residual blowing agent from the foam body by forcing heated air over the exposed surface of the foam body at a predetermined temperature and for a predetermined time sufficient to remove a substantial portion of the residual blowing agent from the foam body and to cause sufficient air to diffuse into the foam body so as not to cause substantial collapse of the foam body.

2. The method of claim 1 wherein the foam body is polyethylene foam sheeting and the step of removing a substantial portion of the residual blowing agent from the foam body comprises heating air to a temperature of from about 110° F. to 130° F. and forcing the heated air over the exposed surface of the foam body.

3. The method of claim 1 wherein the parallel supporting members are bars supported at least at one end by a means for transporting the bars through the heating zone and wherein the step of transporting the bars through the heating zone comprises operating the transporting means.

4. The method of claim 3 wherein the heating zone is a confined area comprising a plurality of substantially parallel bars in an endless path and an endless drive mechanism, and wherein the step of transporting the parallel bars through the heating zone comprises operating the endless drive mechanism so that the bars travel about the endless path, and wherein the method includes the steps of introducing the flexible foam body to the confined area, draping the foam body over at least a portion of the bars to form foam loops, operating the endless drive mechanism to transport the parallel bars about the endless path and the foam loops through the confined area, heating the foam body in the cofined area, removing a substantial portion of the residual blowing agent from the foam body, and removing the foam body from the bars and the confined area, the foam body having a substantially reduced portion of residual blowing agent.

5. The method of claim 1 wherein the step of removing a substantial portion of residual blowing agent from the foam body comprises reducing the amount of residual blowing agent in the foam body by about 50 percent to 80 percent or more.

6. The method of claim 1 wherein the step of removing a substantial portion of residual blowing agent from the foam body comprises reducing the amount of residual blowing agent in the foam body to from about 8 percent to 2 percent by weight or less of the foam body.

7. The method of claim 1 wherein the blowing agent is selected from among flammable volatile organic compounds and mixtures thereof and said step of removing a substantial portion of residual blowing agent from the foam body comprises reducing the concentration of residual flammable blowing agent in the foam body to a level that substantially reduces risk of fire or explosion upon subsequent storage of the foam body in a confined space.

8. The method of claim 7 wherein the blowing agent is selected from the group consisting of butane, isobutane, propane, ethane, and mixtures thereof and the step of removing a substantial portion of residual blowing agent from the foam body comprises reducing the amount of residual blowing agent in the foam body to about 2 percent by weight or less of the foam body.

9. A method for accelerating the removal of residual blowing agent from elongate, flexible foam bodies of a foam extruded thermoplastic polymer, said method comprising the steps of:

(a) incorporating a permeability modifier into a thermoplastic polymer resin from which the foam body will be extrusion foamed in an amount sufficient to control the rate at which the blowing agent diffuses out of the cells of the extrusion foamed body and is replaced therein by air so that the foam body produced therefrom may be maintained at an elevated temperature to accelerate removal of residual blowing agent without substantial reduction in the thickness of the foam;

(b) mixing a flammable volatile organic blowing agent with the resin under pressure;

(c) extrusion foaming the resin to produce the elongate, flexible foam body;

(d) draping the elongate, flexible foam body over a plurality of substantially parallel supporting members extending in a direction substantially transverse to the lengthwise direction of the elongate foam body so as to form free hanging foam loops between the supporting members substantially to maximize the exposed surface area of the foam body;

(e) transporting the parallel supporting members through a heating zone so as to transport the free hanging foam loops through the heating zone substantially in the absence of tension on the foam body to minimize breakage; and (f) removing a substantial portion of the residual blowing agent from the foam body by forcing heated air over the exposed surface of the foam body at a predetermined temperature and for a predetermined time sufficient to remove a substantial portion of the residual blowing agent from the foam body and to cause sufficient air to diffuse into the foam body so as not to cause substantial collapse of the foam body.

10. The method of claim 9 wherein the blowing agent is selected from the group consisting of butane, isobutane, propane, ethane, and mixtures thereof, the permeability modifier is glycerol monostearate, and the step of removing a substantial portion of residual blowing agent from the foam body comprises reducing the amount of residual blowing agent in the foam body to about 2 percent by weight or less of the foam body.

11. A method for accelerating the removal of residual blowing agent from elongate, flexible foam bodies of a foam extruded thermoplastic polymer, said method comprising the steps of:

(a) suspending an elongate, flexible foam body so as to form free hanging foam loops between a plurality of means for supporting the foam body so as substantially to maximize the exposed surface area of the foam body;

(b) transporting the supporting means and free hanging loops of foam supported on the supporting means through a heating zone substantially in the absence of tension on the foam body so as to minimize breakage of the foam body; and (c) maintaining the heating zone at an elevated temperature for a time sufficient to remove a substantial portion of the residual blowing agent from the foam body and to cause sufficient air to diffuse into the foam body so as not to cause substantial collapse of the foam body.

* * * * *

UNITED STATES PATENT AND TRADEMARK OFFICE
CERTIFICATE OF CORRECTION

PATENT NO. : 5,411,689
DATED : May 2, 1995
INVENTOR(S) : Lee et al.

It is certified that error appears in the above-identified patent and that said Letters Patent is hereby corrected as shown below:

Column 8, line 40, "the-heated" should be -- the heated --.

Column 8, line 60, "cofined" should be -- confined --.

Signed and Sealed this

Fifth Day of September, 1995

Attest:

BRUCE LEHMAN

*Attesting Officer*      *Commissioner of Patents and Trademarks*